Feb. 24, 1942.    M. KATCHER    2,274,417
JOINT ASSEMBLY FOR SHOCK ABSORBERS AND THE LIKE
Filed Oct. 10, 1938    2 Sheets-Sheet 1
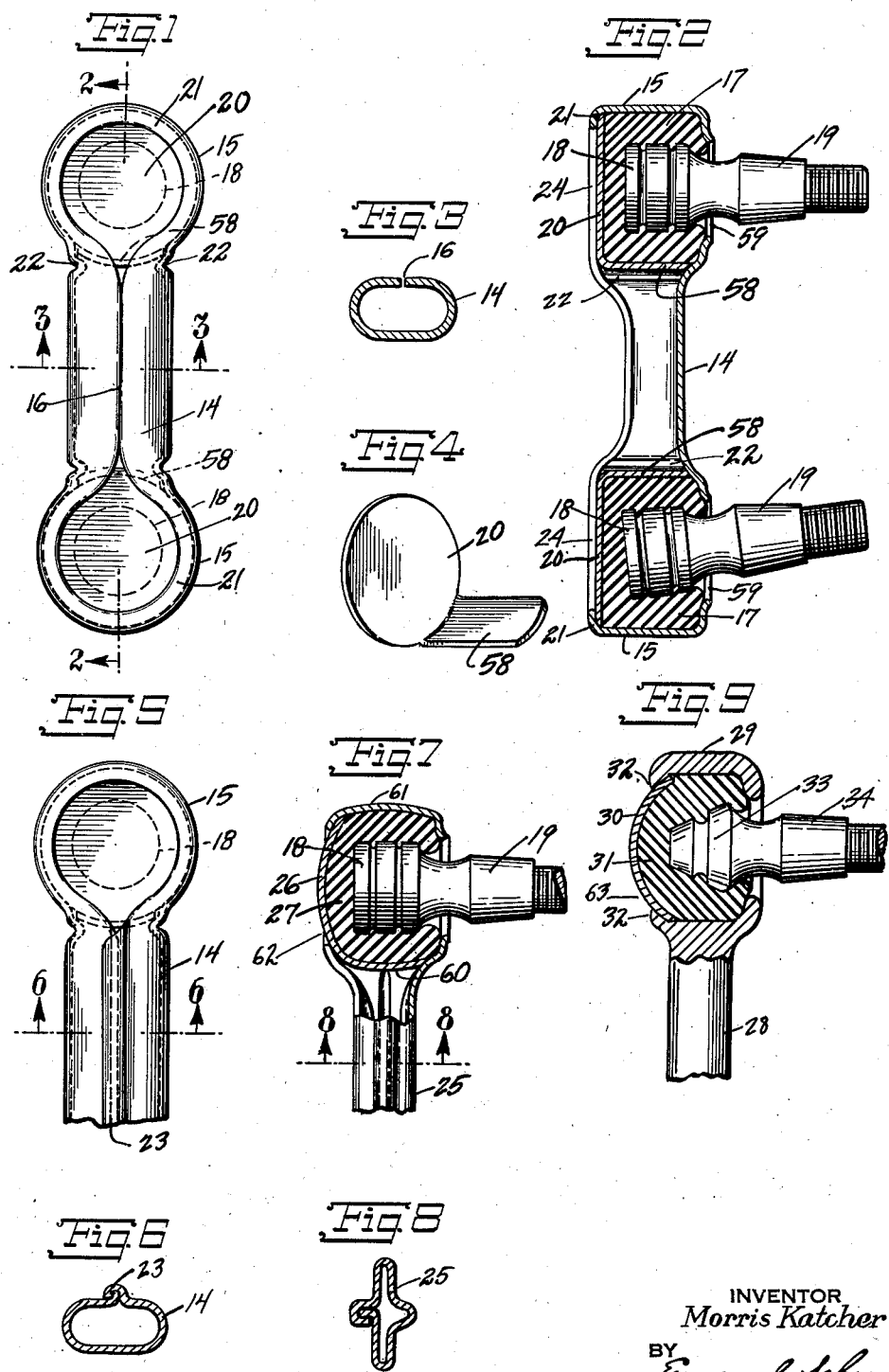
INVENTOR
*Morris Katcher*
BY
*Emanuel Scheyer*
ATTORNEY

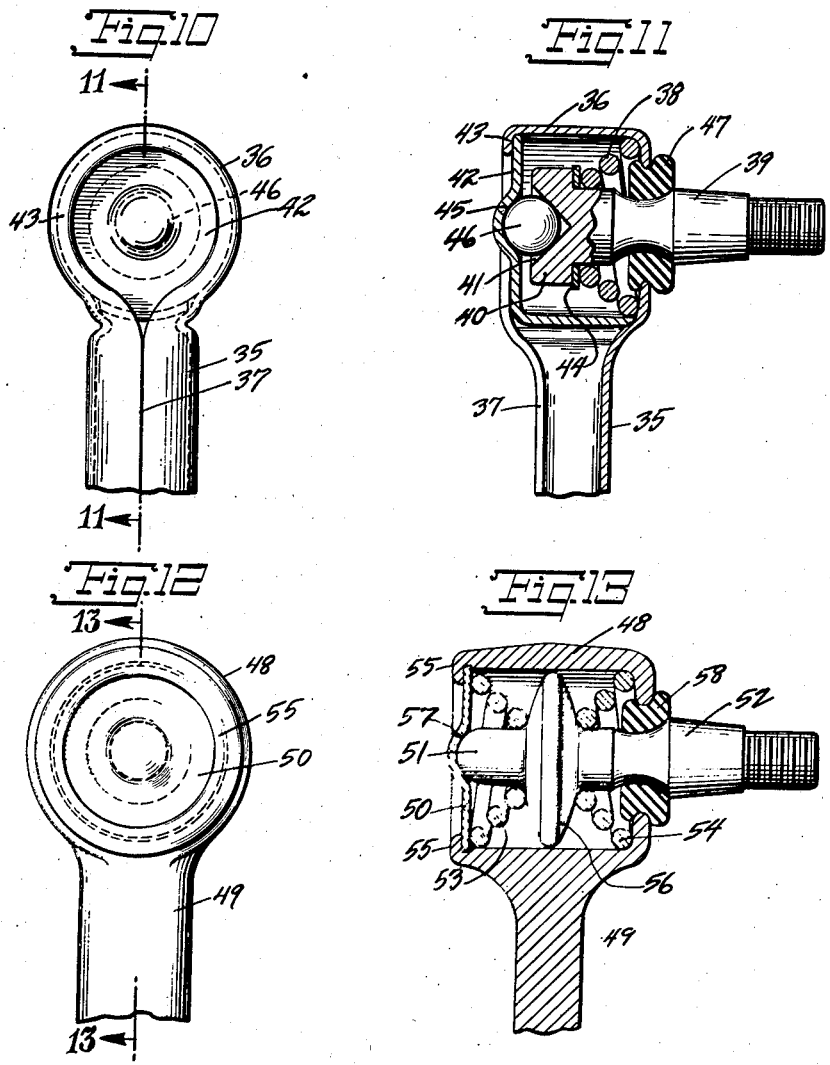

Patented Feb. 24, 1942

2,274,417

UNITED STATES PATENT OFFICE 2,274,417

JOINT ASSEMBLY FOR SHOCK ABSORBERS AND THE LIKE

Morris Katcher, New York, N. Y.

Application October 10, 1938, Serial No. 234,101

2 Claims. (Cl. 287—85)

This invention relates to a link and associated studs and more particularly to a link and studs such as are used in a joint or shock absorber assemblage said link being commonly referred to as a drag or shock link. Such a link has studs at each end mounted normally at right angles to its longitudinal axis. The functioning of the link and studs requires a combined slight relative angular and relative torsional motion between the link and the studs.

Instead of making the link of two pieces each of which is formed at its ends with one half of a cup or socket and bolting them together with the complementary cup parts over the heads of the studs and their dampening mechanism, as has been done heretofore, I am enabled by my construction to make the link with its sockets of one piece. The head of my stud together with its dampening mechanism is inserted through an opening in the socket large enough to pass said head and mechanism. Then said opening is closed by an inset or closure maintaining said parts in the cup. In one form, I use a rubber bushing for dampening and in another springs. Other related forms are to be found in my application, Serial No. 281,321 now Patent No. 2,236,062 dated March 25, 1941.

Other objects and advantages will become apparent upon further study of the description and drawings, in which:

Fig. 1 is a side elevation of a form of my sheet metal drag link having rubber bushings and wherein free ends of the sheet metal abut.

Fig. 2 is a section taken along the line 2—2 of Fig. 1.

Fig. 3 is a section taken along the line 3—3 of Fig. 1.

Fig. 4 is a perspective view of the retaining inset for the rubber bushing taken by itself.

Fig. 5 is a partial side elevation of a form of my sheet metal drag link having rubber bushings and wherein the free ends are seamed.

Fig. 6 is a section taken along the line 6—6 of Fig. 5.

Fig. 7 is a partial elevation and section of another form of my sheet metal drag link having rubber bushings and wherein the free ends are seamed.

Fig. 8 is a section taken along the line 8—8 of Fig. 7.

Fig. 9 is a partial elevation and section of a form of link having a solid shank and rubber bushings.

Fig. 10 is a partial side elevation of a form of my sheet metal drag link having spring mountings.

Fig. 11 is a section taken along the line 11—11 of Fig. 10.

Fig. 12 is a partial side elevation of a form of link having a solid shank and spring mountings, and Fig. 13 is a section taken along the line 13—13 of Fig. 12.

The link of Figs. 1 to 4 is made of a sheet metal stamping comprising the tubular shank portion 14 and drawn sockets 15. The free edges of the stamping at the shank 14 are brought into substantial abutment as indicated at 16, Figs. 1 and 3. Inserted in each socket 15, is a flexible resilient bushing 17, preferably of rubber or a composition largely of rubber. Each bushing 17 before being inserted in its socket 15 is molded or slipped over the cylindrical head 18 of a stud 19. Studs 19 usually form parts of a shock absorber assembly for an automobile. As is well known in the art, one of the studs is connected to a movable lever on the shock absorbing mechanism, while the other stud is fastened to a fixed portion of the frame of an automobile or other vehicle. Each stud 19 with its bushing 17 upon it is inserted in a socket 15 through its opening 24, the shank of the stud extending out of the socket through opening 59 in said socket said latter opening being opposite opening 24. When at first inserted in socket 15, bushing 17 extends out of the socket through opening 24. This extension is not seen in the drawings. Retaining inset 20 is then placed in the socket over bushing 17 forcing its extending portion back into the socket. The edge of the socket is then forced over to form flange 21 for retaining the inset in the socket and holding said bushing under compression. Inset 20 is provided with an apron 58 which comes between the cylindrical face of bushing 17 and the hollow interior of shank 14. It prevents said bushing from spreading under compression into said shank. Notches 22 are indented in the sides of shank 14 for retaining apron 58 in place. Opening 59 is large enough to permit a substantial amount of free motion of stud 19 relative to the link.

The link of Figs. 5 and 6 is similar to the one described above, except that instead of having the free edges of the stamping substantially abut as at 16, Fig. 3, one of said edges overlaps the other to form a seam 23.

The link of Figs. 7 and 8 is similar to that of Figs. 5 and 6 except that the shape of shank 25 is different. Also the cap portion of inset 26 is curved instead of flat as in inset 20, Fig. 2, which gives more rubber opposite the flat end of head 18. Rubber bushing 27 is retained by inset 26 with its apron 60 in socket 61. Bushing 27 fits over cylindrical head 18 of stud 19. Socket 61 has opening 62 for the insertion of bushing 27 and stud 19.

The link of Fig. 9 is forged having a socket 29 and a solid shank 28. Inset 30 which holds rubber bushing 31 is held in place by the spun over edge 32 of socket 29. Bushing 31 fits over the head 33 of stud 34. Head 33 is in the form of a frustum of a cone, allowing more space in socket 29 for rubber. Bushing 31 and stud 34 are inserted into socket 29 through opening 63. Instead of using tapered head 33 in a socket with a forged shank, it will be readily understood that such a head could be used in place of the cylindrical head 18 in a sheet metal construction as in Figs. 2 and 7.

The link of Figs. 10 and 11 is made of a sheet metal stamping comprising the tubular shank portion 35 and drawn sockets one of which is shown at 36. The free edges of the stamping at the shank 35 are brought into substantial abutment at 37. This link, however, differs from the others in that no rubber bushing is used but instead a conical spiral spring 38. Stud 39 is provided with a cylindrical head 40 having a conical recess 41. An inset 42 is held in socket 36 by flange 43 which is formed by forcing over the edge of the socket. Spring 38, which is under compression, reacts against the inside of socket 36 at one end and against washer 44 at the other, said washer being mounted on head 40 opposite a shoulder formed thereon. Inset 42 has a depression 45 formed in it opposite recess 41 in head 40. Fitting in depression 45 on the one hand and recess 41 on the other is a ball bearing 46. Spring 38 causes ball bearing 46 to be squeezed between head 40 and inset 42. The action of ball bearing 46 together with depression 45, recess 41 and spring 38 is to maintain head 40 of stud 39 in position in socket 36 and at the same time permit universal motion of said stud, which motion is resisted by the resilience of spring 38 and to a certain extent by rubber grommet 47, although this is not the essential function of the latter. Grommet 47, which surrounds stud 39 and fits in a hole in socket 36 and completely fills said hole, is provided for excluding dust from the interior of socket 36 and for preventing the escape of grease.

The link of Figs. 12 and 13 is forged having a socket 48 and a solid shank 49. Inset 50, which holds the head 51 of stud 52, together with conical spiral springs 53 and 54, in socket 48, is itself held in place by spun over edge 55 of socket 48. Head 51 is provided with a flange 56. Spring 53 is compressed between inset 50 and flange 56 on head 51, while spring 54 is compressed between flange 56 and the inside face of socket 48. The end of head 51 is rounded and fits in a rounded depression 57 in inset 50. This depression together with the action of springs 53 and 54 maintains head 51 of stud 52 in position in socket 48 and at the same time permits universal motion of said stud which motion is resisted by the resilience of said springs and to a certain extent by rubber grommet 58. The grommet 58, however, as in the case of grommet 47, Fig. 11, is provided for excluding dust from the interior of socket 48 and for preventing the escape of grease.

The mechanism in socket 48 could also be used in socket 36, Fig. 11 instead of the mechanism shown in the latter. The reverse is also true.

I claim:

1. A joint comprising a socket having openings at opposite sides thereof, a shank attached to the socket, a member having a head in the socket and a shaft extending out of the socket through one of said openings, said head being in the form of a frustum of a cone with the end of the head farthest away from said one opening being the small end of the frustum, a bushing of rubber or the like substantially filling the socket around said head, said member and bushing being insertible into their position in the socket through the other of said openings, and an inset closing off said other opening.

2. A joint comprising a socket having an opening at one side and a shank joined to the socket, a member projecting through said opening and having a head in the form of a frustum of a cone in the socket with the end of the head located farthest from the opening being the small end of the frustrum, and a bushing of rubber or the like substantially filling the socket around said head.

MORRIS KATCHER.